(12) United States Patent
Fukumaru et al.

(10) Patent No.: US 10,965,238 B2
(45) Date of Patent: Mar. 30, 2021

(54) POWER CONVERSION APPARATUS, POWER ESTIMATING METHOD FOR ELECTRIC MOTOR, AND CONTROL METHOD FOR ELECTRIC MOTOR

(71) Applicant: Kabushiki Kaisha Yaskawa Denki, Kitakyushu (JP)

(72) Inventors: Shingo Fukumaru, Kitakyushu (JP); Hideaki Iura, Kitakyushu (JP); Shinya Morimoto, Kitakyushu (JP); Akira Yamazaki, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 15/461,770

(22) Filed: Mar. 17, 2017

(65) Prior Publication Data

US 2017/0272016 A1 Sep. 21, 2017

(30) Foreign Application Priority Data

Mar. 18, 2016 (JP) .............................. JP2016-055470

(51) Int. Cl.
*H02P 21/20* (2016.01)
*H02P 27/08* (2006.01)
*H02M 5/458* (2006.01)

(52) U.S. Cl.
CPC .............. *H02P 27/08* (2013.01); *H02P 21/20* (2016.02); *H02M 5/458* (2013.01)

(58) Field of Classification Search
CPC ...... H02P 21/14; H02P 23/14; H02P 2205/03; H02P 27/04; H02P 27/05; H02P 7/293; H02P 27/08; H02P 21/20; H02J 3/16; H02J 3/18; F03D 7/0272; F03D 7/028; H02M 5/458

See application file for complete search history.

(56) References Cited

U.S. PATENT DOCUMENTS 5,184,057 A * 2/1993 Sakai .................. H02M 5/4585
                                                   318/801
7,049,783 B2 * 5/2006 Yoshinaga .............. H02P 21/05
                                                   318/629

(Continued)

FOREIGN PATENT DOCUMENTS

JP       2003-259680 A     9/2003
JP       2017-118601 A     6/2017

OTHER PUBLICATIONS

Office Action dated Jan. 9, 2018 in Japanese Patent Application No. 2016-055470 (with unedited computer generated English translation), 5 pages.

*Primary Examiner* — Bickey Dhakal
(74) *Attorney, Agent, or Firm* — Oblon, McClelland, Maier & Neustadt, L.L.P.

(57) ABSTRACT

A power conversion apparatus includes a power converter circuit that outputs an AC power to an electric motor, and circuitry that controls the power converter circuit to add a first change, accompanying a change of a power generated by the electric motor, to a first phase angle, which is a phase angle of a magnetic flux direction of the electric motor corresponding to the AC power, extracts a component generated by the first change from first information indicating the electric power supplied to the electric motor, and estimates the power generated by the electric motor based on the component.

22 Claims, 5 Drawing Sheets

(56) References Cited

U.S. PATENT DOCUMENTS

| | | | | |
|---|---|---|---|---|
| 7,176,652 B2* | 2/2007 | Wakabayashi | .......... | H02P 29/50 |
| | | | | 318/400.02 |
| 8,395,360 B2* | 3/2013 | Tripathi | ................ | F03D 7/0272 |
| | | | | 290/44 |
| 8,547,713 B2* | 10/2013 | Kono | ................ | H02M 7/53871 |
| | | | | 318/716 |
| 9,041,325 B2* | 5/2015 | Yamazaki | ............. | H02P 21/146 |
| | | | | 318/400.01 |
| 2013/0342142 A1* | 12/2013 | Marcinkiewicz | ....... | H02P 6/205 |
| | | | | 318/400.11 |

* cited by examiner

POWER CONVERSION APPARATUS, POWER ESTIMATING METHOD FOR ELECTRIC MOTOR, AND CONTROL METHOD FOR ELECTRIC MOTOR

CROSS-REFERENCE TO RELATED APPLICATION

This application claims priority from Japanese Patent Application No. 2016-055470 filed with the Japan Patent Office on Mar. 18, 2016, the entire content of which is hereby incorporated by reference.

BACKGROUND

1. Technical Field

The present disclosure relates to a power conversion apparatus, a power estimating method for an electric motor, and a control method for the electric motor.

2. Related Art

JP-A-2003-259680 discloses a synchronous motor driving apparatus including an electric current phase controller. The electric current phase controller outputs an excitation current command value in order to control a phase angle of an electric current so as to increase an output torque.

SUMMARY

According to one aspect of the present invention, a power conversion apparatus includes a power converter circuit that outputs an AC power to an electric motor, and circuitry that controls the power converter circuit to add a first change, accompanying a change of a power generated by the electric motor, to a first phase angle, which is a phase angle of a magnetic flux direction of the electric motor corresponding to the AC power, extracts a component generated by the first change from first information indicating the electric power supplied to the electric motor, and estimates the power generated by the electric motor based on the component.

According to another aspect of the present invention, a power estimating method for an electric motor includes adding a first change accompanying a change of a power generated by an electric motor to a first phase angle, which is a phase angle of a magnetic flux direction of the electric motor corresponding to a supplied AC power, extracting a component generated by the first change from first information indicating an electric power supplied to the electric motor, and estimating the power generated by the electric motor based on the component.

According to yet another aspect of the present invention, a control method for an electric motor includes controlling a power converter circuit to add a first change accompanying a change of a power generated by an electric motor to a first phase angle, which is a phase angle of a magnetic flux direction of the electric motor corresponding to a supplied AC power, extracting a component generated by the first change from first information indicating an electric power supplied to the electric motor, and estimating the power generated by the electric motor based on the component.

DETAILED DESCRIPTION

Figure 1:
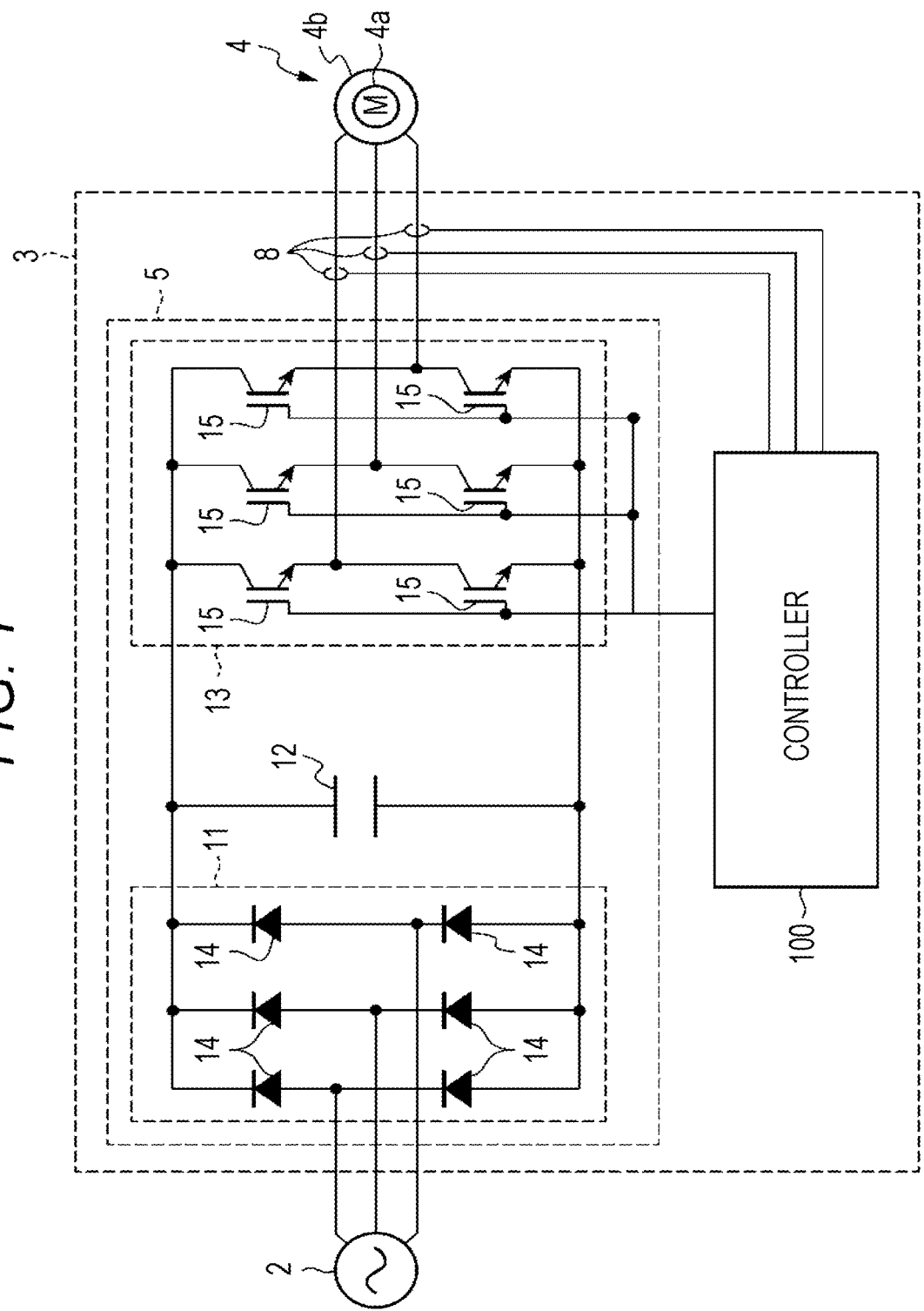
FIG. 1 is a pattern diagram illustrating a schematic configuration of a power conversion apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A power conversion apparatus according to one aspect of the present disclosure includes: a power converter circuit that outputs an AC power to an electric motor; and a controller configured to execute: controlling the power converter circuit such that a first change accompanying a change of a power generated by the electric motor is added to a first phase angle as a phase angle of a magnetic flux direction of the electric motor corresponding to the AC power, and extracting a component generated by the first change from information regarding the electric power supplied to the electric motor and estimating the power generated by the electric motor based on the component.

A power estimating method for an electric motor according to one aspect of the present disclosure includes: adding a first change accompanying a change of a power generated by an electric motor to a first phase angle as a phase angle of a magnetic flux direction of the electric motor corresponding to a supplied AC power; and extracting a component generated by the first change from information regarding an electric power supplied to the electric motor and estimating the power generated by the electric motor based on the component.

A control method for an electric motor according to one aspect of the present disclosure includes: controlling a power converter circuit such that a first change accompanying a change of a power generated by an electric motor is added to a first phase angle as a phase angle of a magnetic flux direction of the electric motor corresponding to a supplied AC power; and extracting a component generated by the first change from information regarding an electric power supplied to the electric motor and estimating the power generated by the electric motor based on the component.

According to the above-described aspect of the present disclosure, an apparatus and a method that are configured to estimate a power can be provided.

The following describes an embodiment in detail with reference to the drawings. In the following description, like reference numerals designate corresponding or identical elements or elements with corresponding or identical functions, and therefore such elements will not be further elaborated here.

1. Power Conversion Apparatus

A power conversion apparatus 3 illustrated in FIG. 1 converts an electric power supplied from a power supply 2 into an AC power (for example, a three-phase AC power) having a desired amplitude, phase, and frequency, and outputs this AC power to an electric motor 4. The power supply 2 may be an AC power supply or may be a DC power supply. An example of the AC power supply includes a commercial electric power system that supplies the AC power, such as the three-phase AC.

The electric motor 4 includes a rotor 4a and a stator 4b, and generates the power in the rotor 4a corresponding to the supplied AC power. The electric motor 4 may include a plurality of coils that generates a magnetic field corresponding to the AC power in a stator 4b side or a rotor 4a side. The electric motor 4 may be a rotary type motor or may be a linear type motor. In the case where the electric motor 4 is the rotary type, the electric motor 4 includes a rotator as the rotor 4a and generates a rotating torque applied to the rotor 4a as the above-described power. In the case where the electric motor 4 is the linear type, the electric motor 4 includes a moving body as the rotor 4a and generates a thrust applied to the rotor 4a as the above-described power. The electric motor 4 may be a synchronous motor or may be an induction motor.

In the following description, the case where the power supply 2 is the three-phase AC power supply and the electric motor 4 is the rotary type synchronous motor is shown as an example. The synchronous motor may be a type with a permanent magnet or may be a type without the permanent magnet. Examples of the synchronous motor with the permanent magnet include an Interior Permanent Magnet (IPM) motor, a Surface Permanent Magnet (SPM) motor, and the like. Examples of the synchronous motor without the permanent magnet include a synchronous reluctance motor and the like. The synchronous motor may be a type disposing an armature in a stator side or may be a type disposing the armature in a rotor side. In the following description, the electric motor 4 includes the permanent magnet in the rotor 4a side and the armature in the stator 4b side. The electric motor 4 is the rotary type and the armature includes a coil for generating a rotating magnetic field.

The power conversion apparatus 3 includes a power converter circuit 5, an electric current sensor 8, and a controller 100. The following describes examples of respective specific configurations.

(1) Power Converter Circuit

The power converter circuit 5 outputs the AC power to the electric motor 4. For example, the power converter circuit 5 converts the three-phase AC power supplied from the power supply 2 into the three-phase AC power having an amplitude, a phase, and a frequency corresponding to a control signal output from the controller 100, and outputs the electric power after the conversion to the electric motor 4. More specifically, the power converter circuit 5 includes a rectifier 11, a condenser 12, and a switcher 13.

The rectifier 11 converts the three-phase AC power supplied from the power supply 2 into the DC power by rectification. The rectifier 11 is, for example, a diode bridge. As illustrated in FIG. 1, this diode bridge, for example, includes three sets of two diodes 14 that are coupled in series. The three sets of two diodes 14 are coupled to one another in parallel.

The condenser 12 is arranged in the latter part of the rectifier 11. The condenser 12 is coupled between two output terminals of the rectifier 11. The condenser 12 smoothes a DC voltage output from the rectifier 11. The condenser 12 is, for example, an electrolytic condenser.

The switcher 13 converts the DC power generated by the rectifier 11 and the condenser 12 into the three-phase AC power having the amplitude, the phase, and the frequency corresponding to the control signal output from the controller 100. As illustrated in FIG. 1, the switcher 13, for example, includes three sets of two switching elements 15 that are coupled in series. The three sets of two switching elements 15 are coupled to one another in parallel. Rectifier elements, such as the diodes, may be coupled in parallel to the switching elements 15 as necessary.

An ON state and an OFF state of the switching element 15 are switched at a predetermined timing corresponding to an output signal from the controller 100. Concrete examples of the switching element 15 include an Insulated Gate Bipolar Transistor (IGBT), a Gate Turn-Off (GTO) thyristor, a Metal-Oxide-Semiconductor Field-Effect Transistor (MOSFET), and the like.

(2) Electric Current Sensor

The electric current sensor 8 detects an electric current generated in the electric motor 4 (for example, an electric current that flows in the coil of the electric motor 4) due to the AC power output from the power converter circuit 5. For example, the electric current sensor 8 is disposed in a conductive path that couples the switcher 13 to the electric motor 4. The electric current sensor 8 is not necessarily disposed within the power converter circuit 5, but may be disposed outside the power converter circuit 5. For example, the electric current sensor 8 may be disposed in the electric motor 4 or may be disposed in a routing path between the power converter circuit 5 and the electric motor 4. That is, the power converter circuit 5 does not necessarily include the electric current sensor 8. In this case, the controller 100 may obtain information regarding the electric current from the electric current sensor 8 disposed outside.

(3) Controller

The controller 100 is configured to execute controlling of the power converter circuit 5 so as to add a first change accompanying a change of the power generated by the electric motor 4 to a first phase angle, which is a phase angle of a magnetic flux direction of the electric motor 4 corresponding to the AC power supplied. Furthermore, the controller 100 is configured to execute extracting a component generated by the first change from the information regarding the electric power supplied to the electric motor 4 and estimating the power generated by the electric motor 4 based on this component.

The controller 100 may be configured to further execute controlling the power converter circuit 5 such that the estimated power is approximated to a power target value.

Figure 2:
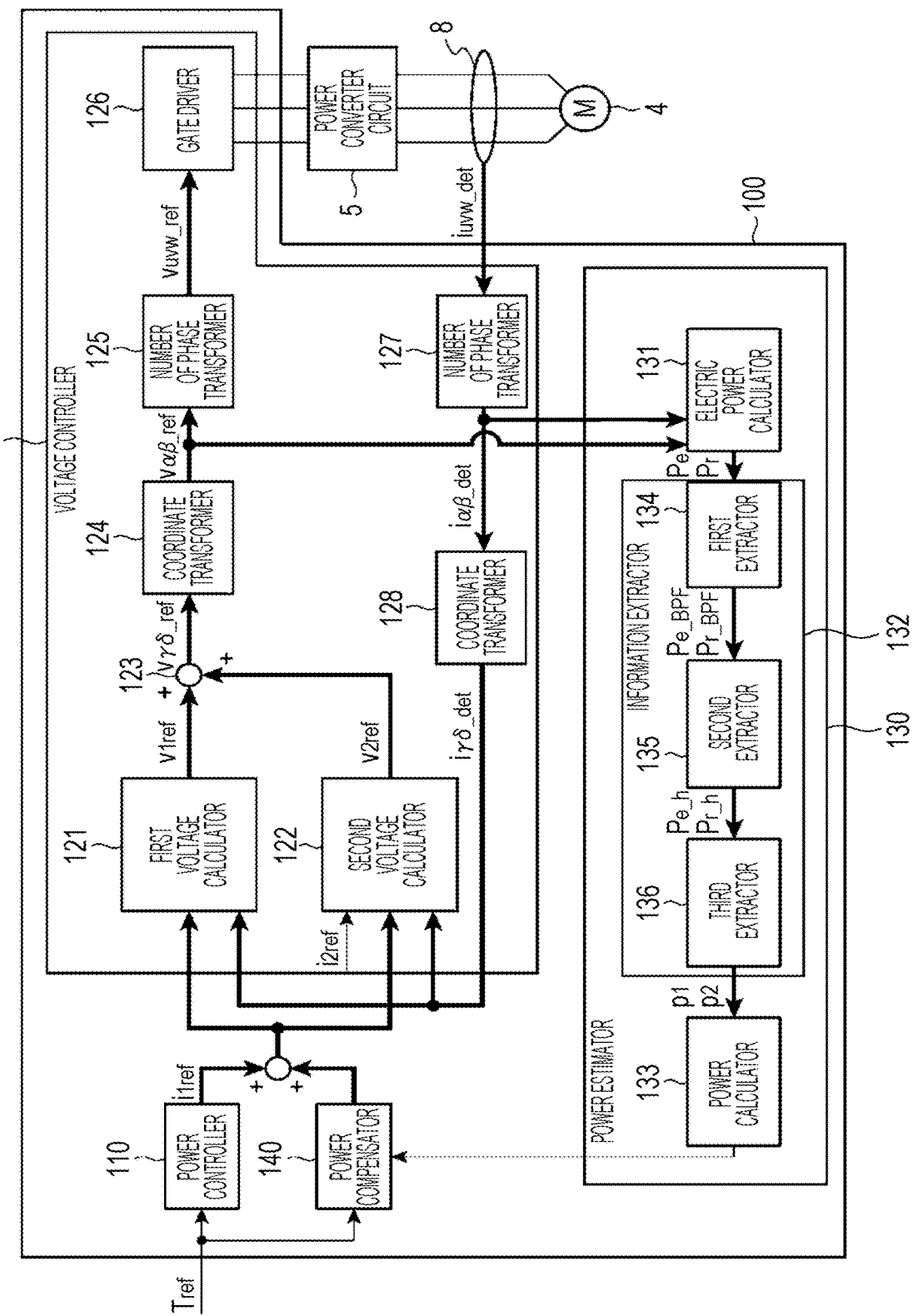
FIG. 2 is a block diagram illustrating a functional configuration of a controller.

The following describes a specific configuration of the controller 100 as an example with reference to FIG. 2. As illustrated in FIG. 2, the controller 100 includes a power controller 110, a voltage controller 120, a power estimator 130, and a power compensator 140, as a function module.

The power controller 110 calculates a first target electric current $i_{1ref}$ corresponding to the power target value (for example, a torque target value) $T_{ref}$. The first target electric current $i_{1ref}$ can be expressed, for example, as an electric current vector. The electric current vector is a three-phase AC current, which is supplied to the plurality of coils of the stator 4b or the rotor 4a, converted into a single vector in αβ coordinate system or γδ coordinate system. The αβ coordinate system is a coordinate system fixed to the stator 4b and has the rotational center as the origin in a plane perpendicular to the rotational center of the rotor 4a. The γδ coordinate system is a coordinate system fixed to the rotor 4a and has the rotational center as the origin in a plane perpendicular to the rotational center of the rotor 4a.

The voltage controller 120 controls the power converter circuit 5 so as to add the first change accompanying the power generated by the electric motor 4 to the first phase angle, which is the phase angle of the magnetic flux direction of the electric motor 4 corresponding to the AC power supplied. The magnetic flux direction of the electric motor 4 corresponding to the AC power is, for example, a direction of the magnetic field synthesized with a magnetic field generated by the plurality of coils of the stator 4b or the rotor 4a corresponding to the AC power. An amount of the change of the power corresponding to the first change differs depending on a value of the phase angle when the first change is added. While the change amount of the power possibly becomes so slight that an actual measurement is difficult, the change amount of the power corresponds to the first change as long as the change of the phase angle accompanies the change of the power in theory.

Figure 3:
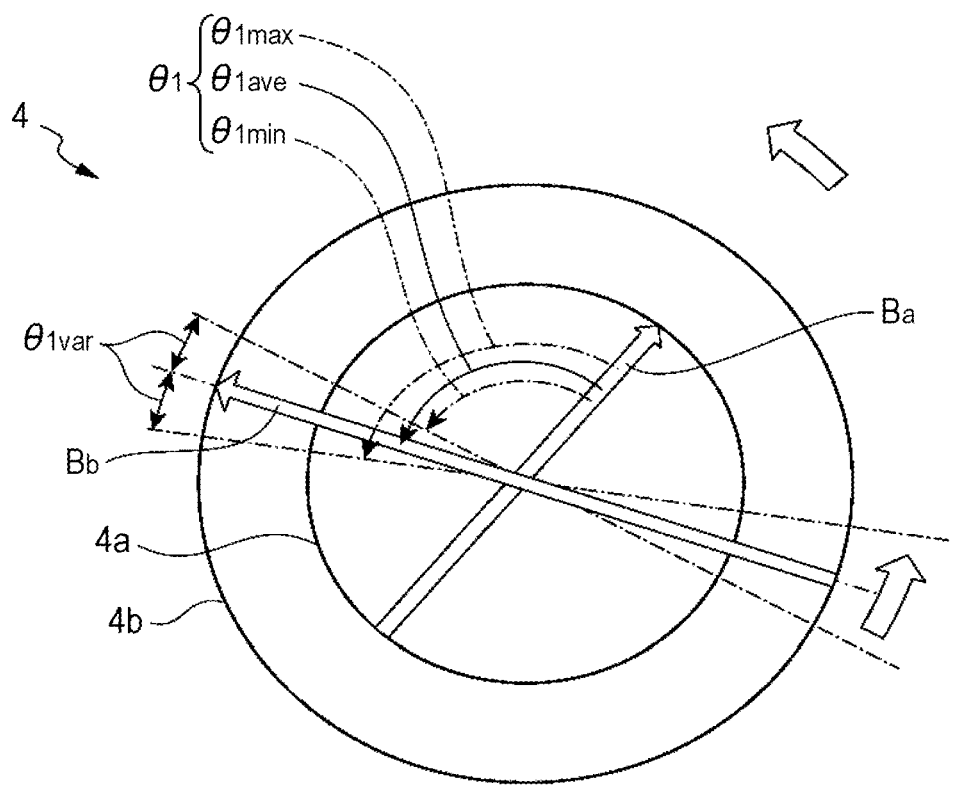
FIG. 3 is a pattern diagram illustrating a first phase angle.

The following describes the case where the electric motor 4 is the synchronous motor including the armature in any one of the stator or the rotor and the permanent magnet in the other of the stator or the rotor as one example. In this case, the voltage controller 120 may add the above-described first change to a first phase angle $\theta_1$, which is an angle between a magnetic flux direction $B_a$ of the rotor 4a side and a magnetic flux direction $B_b$ of the stator 4b side as illustrated in FIG. 3.

The magnetic flux direction $B_a$ of the rotor 4a side is a direction of a magnetic flux vector synthesized with the magnetic flux generated from the rotor 4a. That is, the magnetic flux direction $B_a$ of the rotor 4a side is a direction of a synthetic magnetic field of the magnetic field generated from the rotor 4a. In the case where the rotor 4a includes a plurality of the permanent magnets, a direction of the magnetic field synthesized with the magnetic field generated from the plurality of permanent magnets corresponds to the magnetic flux direction $B_a$ of the rotor 4a side.

Similarly, the magnetic flux direction $B_b$ of the stator 4b side is a direction of the magnetic flux vector synthesized with the magnetic flux generated from the stator 4b. That is, the magnetic flux direction $B_b$ of the stator 4b side is a direction of a synthetic magnetic field of the magnetic field generated from the stator 4b. In the case where the stator 4b includes the armature, a direction of a rotating magnetic field synthesized with the magnetic field generated from the plurality of coils of the armature corresponds to the magnetic flux direction $B_b$ of the stator 4b side.

Adding the first change to the first phase angle $\theta_1$ may include superimposing a variation component for estimating the power (hereinafter referred to as a "first variation component $\theta_{1var}$") to the first phase angle $\theta_1$ for obtaining a desired power (hereinafter referred to as a "first basic phase angle $\theta_{1ave}$"). In this case, the first variation component $\theta_{1var}$ corresponds to the first change. The first basic phase angle $\theta_{1ave}$ is, for example, the first phase angle $\theta_1$ in the case where the electric current generated in the electric motor 4 matches the first target electric current $i_{1ref}$.

The first change may include a periodic variation. For example, the voltage controller 120 may be configured to superimpose the first variation component $\theta_{1var}$ that periodically varies to the first basic phase angle $\theta_{1ave}$. The voltage controller 120 may be configured to superimpose the first variation component $\theta_{1var}$ having a sine wave shape to the first basic phase angle $\theta_{1ave}$. The first variation component $\theta_{1var}$ may be set to vary the first phase angle $\theta_1$ in both directions of a positive side and a negative side using the first basic phase angle $\theta_{1ave}$ as a reference.

The above-described periodic variation of the first phase angle $\theta_1$ may include a variation at a higher frequency than a frequency of the AC power output from the power converter circuit 5. For example, the voltage controller 120 may be configured to superimpose the first variation component $\theta_{1var}$, which is a higher frequency than the frequency of the AC power output from the power converter circuit 5, to the first basic phase angle $\theta_{1ave}$. The frequency of the AC power output from the power converter circuit 5 is a frequency of the AC power to cause the first phase angle $\theta_1$ to match the first basic phase angle $\theta_{1ave}$.

The aspect of the first change is not limited to the periodic variation. As long as theoretically accompanying the change of the power generated by the electric motor 4, the first change of any sort of aspect may be added to the first phase angle $\theta_1$. For example, it is only necessary for the first change to include at least transitioning the first phase angle $\theta_1$ from one angle to another angle.

Figure 4:
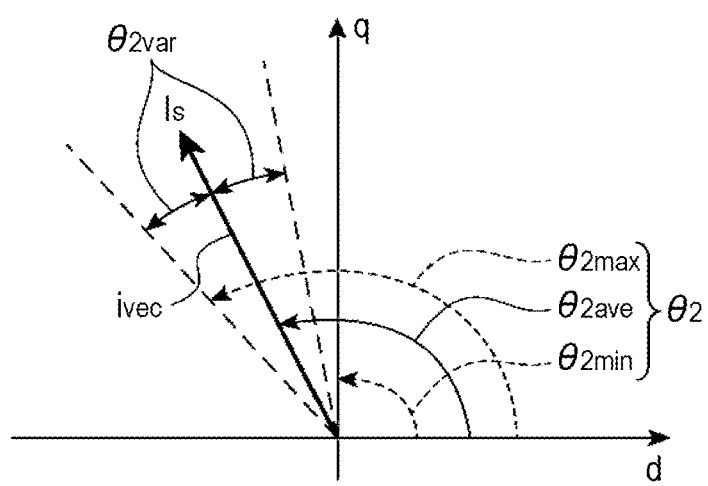
FIG. 4 is a pattern diagram illustrating a second phase angle.

Controlling the power converter circuit 5 so as to add the first change to the first phase angle $\theta_1$ includes controlling the power converter circuit 5 so as to change the first phase angle $\theta_1$ as a result of changing a value correlating with the first phase angle $\theta_1$. For example, controlling the power converter circuit 5 so as to add the first change to the first phase angle $\theta_1$ includes controlling the power converter circuit 5 so as to add a second change accompanying the change of the power to a second phase angle, which is a phase angle of the electric current vector of the electric motor 4. The electric current vector is, for example, a three-phase AC current, which is supplied to the plurality of coils of the stator 4b or the rotor 4a of the electric motor 4, converted into a single vector in the αβ coordinate system or the γδ coordinate system. In the synchronous motor including the armature in any one of the stator 4b or the rotor 4a, and the permanent magnet in the other of the stator 4b or the rotor 4a, as illustrated in FIG. 4, the angle between a d-axis direction (the magnetic flux direction of the rotor 4a side) in the γδ coordinate system and an electric current vector $i_{vec}$ may be set as a second phase angle $\theta_2$ and the second change may be added to this second phase angle $\theta_2$.

Adding the second change to the second phase angle $\theta_2$ may include superimposing a variation component for estimating the power (hereinafter referred to as a "second variation component $\theta_{2var}$") to the second phase angle $\theta_2$ for obtaining a desired power (hereinafter referred to as a "second basic phase angle $\theta_{2ave}$"). In this case, the second variation component $\theta_{2var}$ corresponds to the second change. The second basic phase angle $\theta_{2ave}$ is, for example, the phase angle with respect to the d-axis of the vector of the first target electric current $i_{1ref}$.

The second change may include a periodic variation. For example, the voltage controller 120 may be configured to superimpose the second variation component $\theta_{2var}$ that periodically varies to the second basic phase angle $\theta_{2ave}$. The voltage controller 120 may be configured to superimpose the second variation component $\theta_{2var}$ having the sine wave shape to the second basic phase angle $\theta_{2ave}$. The second variation component $\theta_{2var}$ may be set to vary the second phase angle $\theta_2$ in both directions of the positive side and the negative side using the second basic phase angle $\theta_{2ave}$ as a reference.

The aspect of the second change is not limited to the periodic variation. As long as theoretically accompanying the change of the power generated by the electric motor 4, the second change of any sort of aspect may be added to the second phase angle $\theta_2$. For example, it is only necessary for the second change to include at least transitioning the second phase angle $\theta_2$ from one angle to another angle.

The above-described periodic variation of the second phase angle $\theta_2$ may include a variation at a higher frequency than the frequency of the AC power output from the power converter circuit 5. For example, the voltage controller 120 may be configured to superimpose the second variation component $\theta_{2var}$, which is a higher frequency than the frequency of the AC power output from the power converter circuit 5, to the second basic phase angle $\theta_{2ave}$. The frequency of the AC power output from the power converter circuit 5 is a frequency of the AC power to cause the second phase angle $\theta_2$ to match the second basic phase angle $\theta_{2ave}$.

Referring again to FIG. 2, the voltage controller 120 includes, for example, a first voltage calculator 121, a second voltage calculator 122, an adder 123, a coordinate transformer 124, a number of phase transformer 125, a gate driver 126, a number of phase transformer 127, and a coordinate transformer 128.

The first voltage calculator 121 calculates a first voltage command value $v_{1ref}$ to generate an electric current corresponding to the first target electric current $i_{1ref}$. The first voltage command value $v_{1ref}$ can be expressed, for example, as a voltage vector. The voltage vector is a three-phase AC voltage, which is applied to the coils of the stator 4b, converted into a single vector in the $\alpha\beta$ coordinate system or the $\gamma\delta$ coordinate system.

For example, the first voltage calculator 121 calculates the first voltage command value $v_{1ref}$ such that the electric current detected by the electric current sensor 8 (hereinafter referred to as a "detected electric current $i_{det}$") is approximated to the first target electric current $i_{1ref}$. The first voltage calculator 121 may calculate the first voltage command value $v_{1ref}$ so as to cause the electric current detected by the electric current sensor 8 to match the first target electric current $i_{1ref}$. Matching means a substantial match, which includes a state in which a slight deviation remains.

The second voltage calculator 122 obtains a second target electric current $i_{2ref}$ to superimpose the first variation component $\theta_{1var}$ to the first basic phase angle $\theta_{1ave}$, and calculates a second voltage command value $v_{2ref}$ to generate the electric current corresponding to this second target electric current $i_{2ref}$. The second voltage command value $v_{2ref}$ can also be expressed as the voltage vector similarly to the first voltage command value $v_{1ref}$. For example, the second voltage calculator 122 may be configured to calculate the second voltage command value $v_{2ref}$ to superimpose the first variation component $\theta_{1var}$ that periodically varies at a higher frequency than the frequency of the AC power output from the power converter circuit 5 to the first basic phase angle $\theta_{1ave}$. In this case, the second voltage calculator 122 calculates the second voltage command value $v_{2ref}$ that periodically varies at a higher frequency than the first voltage command value $v_{1ref}$.

The adder 123 calculates a voltage command value $v_{ref}$ by combining the first voltage command value $v_{1ref}$ and the second voltage command value $v_{2ref}$.

The coordinate transformer 124 performs a coordinate transformation to the voltage command value $v_{ref}$. For example, the coordinate transformer 124 transforms a voltage command value $v_{\gamma\gamma\_ref}$ in the $\gamma\delta$ coordinate system to a voltage command value $v_{\alpha\beta\_ref}$ in the $\alpha\beta$ coordinate system. The number of phase transformer 125 transforms the voltage command value $v_{\alpha\beta\_ref}$ in the $\alpha\beta$ coordinate system to a voltage command value $v_{uvw\_ref}$ of the three-phase AC.

The gate driver 126 controls the power converter circuit 5 such that the power converter circuit 5 applies a voltage corresponding to the voltage command value $v_{uvw\_ref}$ to the coils of the electric motor 4. For example, the gate driver 126 outputs a control signal to the switching elements 15 so as to adjust the output voltage by a Pulse Width Modulation (PWM) method.

The number of phase transformer 127 transforms the three-phase AC current detected by the electric current sensor 8 (a detected electric current $i_{uvw\_det}$) to a single electric current vector in the $\alpha\beta$ coordinate system (a detected electric current $i_{\alpha\beta\_det}$). The coordinate transformer 128 performs a coordinate transformation to the detected electric current $i_{\alpha\beta\_det}$. For example, the coordinate transformer 128 transforms the detected electric current $i_{\alpha\beta\_det}$ to an electric current vector in the $\gamma\delta$ coordinate system (a detected electric current $i_{\gamma\delta\_det}$) and feeds this back to the first voltage calculator 121.

In the configuration described above, the second phase angle $\theta_2$ matches the above-described second basic phase angle $\theta_{2ave}$ when the detected electric current $i_{det}$ matches the first target electric current $i_{1ref}$ according to the first voltage command value $v_{1ref}$. According to this, the first phase angle $\theta_1$ matches the above-described first basic phase angle $\theta_{1ave}$. The above-described second variation component $\theta_{2var}$ is superimposed to the second phase angle $\theta_2$ when the second voltage command value $v_{2ref}$ is added to the first voltage command value $v_{1ref}$ (see FIG. 4). According to this, the above-described first variation component $\theta_{1var}$ is superimposed to the first phase angle $\theta_1$ (see FIG. 3).

The voltage controller 120 may be configured to further execute compensating a response delay of the electric current to the second target electric current $i_{2ref}$ to periodically vary the first phase angle $\theta_1$. For example, the second voltage calculator 122 may calculate the second voltage command value $v_{2ref}$ so as to compensate a response delay of the detected electric current $i_{det}$ to the second target electric current $i_{2ref}$. More specifically, the second voltage calculator 122 may calculate the second voltage command value $v_{2ref}$ so as to decrease the deviation between the second target electric current $i_{2ref}$ and the detected electric current $i_{det}$.

The power estimator 130 executes extracting a component generated by the change of the first phase angle $\theta_1$ from the information regarding the electric power supplied to the electric motor 4, and estimating the power generated by the electric motor 4 based on this component.

The power estimator 130 may be configured to estimate the power corresponding to the first phase angle $\theta_1$ between a maximum value $\theta_{1max}$ and a minimum value $\theta_{1min}$ of the first phase angle $\theta_1$ in transition (see FIG. 3). Estimating the power corresponding to the first phase angle $\theta_1$ between the maximum value $\theta_{1max}$ and the minimum value $\theta_{1min}$ includes estimating the power corresponding to the second phase angle $\theta_2$ between a maximum value $\theta_{2max}$ and a minimum value $\theta_{2min}$ of the second phase angle $\theta_2$ in transition (see FIG. 4). The maximum values $\theta_{1max}$ and $\theta_{2max}$ and the minimum values $\theta_{1min}$ and $\theta_{2min}$ are, for example, the maximum values and the minimum values in a predetermined period of time. The predetermined period of time is, for example, a sampling time of data (such as information regarding the electric power supplied to the electric motor 4) to estimate the power. The predetermined period of time is appropriately set so as to obtain desired estimation accuracy.

For example, the power estimator 130 includes an electric power calculator 131, an information extractor 132, and a power calculator 133. The electric power calculator 131 calculates information regarding the electric power supplied to the electric motor 4 (hereinafter referred to as "electric power information"). The electric power information may include information regarding a reactive power (hereinafter referred to as "reactive power information") and information regarding an effective power (hereinafter referred to as "effective power information") that are supplied to the electric motor 4.

For example, the electric power calculator 131 calculates the above-described electric power information based on information regarding the voltage supplied to the electric motor 4 (hereinafter referred to as "voltage information") and information regarding the electric current supplied to the electric motor 4 (hereinafter referred to as "electric current information"). The electric power calculator 131 may use a command value (for example, the above-described voltage command value $v_{ref}$) of the voltage supplied to the electric motor 4 as the voltage information. The electric power calculator 131 may use information regarding the three-phase AC current (for example, the above-described detected electric current $i_{det}$) detected by the electric current sensor 8 as the electric current information. The electric power calculator 131 may use the detected value by the sensor for the voltage information as necessary.

Here, when the first phase angle $\theta_1$ is varied as described above, a component that correlates with the power appears in the electric power information. The following specifically describes an example of a case where the second variation component $\theta_{2var}$ that periodically varies is superimposed to the second basic phase angle $\theta_{2ave}$ using formulas of a case where the electric motor 4 is an IPM motor.

First, the power (torque) is calculated with the following formula (1) using a cross product of the magnetic flux and the electric current.

$$T = \phi I_s \sin\theta_2 + \frac{1}{2}(L_d - L_q)I_s^2 \sin 2\theta_2 \tag{1}$$

φ: an induced voltage constant, $I_s$: an amplitude of the detected electric current $i_{det}$, $\theta_2$: the second phase angle, $L_d$: an inductance in the d-axis direction, $L_q$: an inductance in the q-axis direction In the formula (1), a first term indicates a magnetic torque, and a second term indicates a reluctance torque. The d-axis is the d-axis in the above-described γδ coordinate system and the q-axis is a coordinate axis perpendicular to the d-axis.

An effective power $P_e$ and a reactive power $P_r$ in the case where a second variation component in a sine wave shape having an angular frequency $\omega_h$ is superimposed to the second basic phase angle $\theta_{2ave}$ are approximately calculated with the following formulas (2) and (3).

$$P_e = RI_s^2 + \frac{1}{2}\omega I_s^2(L_d - L_q)\sin 2\theta_{2ave} + \tag{2}$$

$$\omega\phi I_s \sin\theta_{2ave} + \frac{1}{2}A^2 RI_s^2 - \frac{1}{4}A^2 \omega I_s^2(L_d - L_q)\sin 2\theta_{2ave} -$$

$$\frac{1}{2}A^2 RI_s^2 \cos(2\omega_h t) + \frac{1}{4}A^2 \omega I_s^2(L_d - L_q)\sin 2\theta_{2ave}\cos(2\omega_h t) +$$

$$\frac{1}{2}A^2 \omega_h I_s^2(L_d \sin^2\theta_{2ave} + L_q \cos^2\theta_{2ave})\sin(2\omega_h t) -$$

$$\frac{1}{2}A\omega_h I_s^2(L_d - L_q)\sin 2\theta_{2ave}\cos(\omega_h t) +$$

$$A\omega I_s^2(L_d - L_q)\cos 2\theta_{2ave}\sin(\omega_h t) + A\omega\phi I_s \cos\theta_{2ave}\sin(\omega_h t)$$

$$P_r = \frac{3}{2}\begin{cases} -\omega\phi I_s \cos\theta_{2ave} - \omega I_s^2(L_q \sin^2\theta_{2ave} + L_d \cos^2\theta_{2ave}) - \\ \frac{1}{2}A^2 \omega I_s^2(L_q \cos^2\theta_{2ave} + L_d \sin^2\theta_{2ave}) - \\ A\omega_h I_s^2(L_d \sin^2\theta_{2ave} + L_q \cos^2\theta_{2ave})\cos(\omega_h t) - \\ \frac{1}{4}A^2 \omega_h I_s^2(L_d - L_q)\sin 2\theta_{2ave}\sin(2\omega_h t) + \\ \frac{1}{2}A^2 \omega I_s^2(L_q \cos^2\theta_{2ave} + L_d \sin^2\theta_{2ave})\cos(2\omega_h t) + \\ (A\omega I_s^2(L_d - L_q)\sin 2\theta_{2ave} + A\omega\phi I_s \sin\theta_{2ave})\sin(\omega_h t) \end{cases} \tag{3}$$

R: a resistance of the coil of the stator 4b, ω: an angular frequency of the rotor 4a, A: an amplitude of the second variation component In the formula (2), an amplitude $p_1$ of a cosine component having an identical angular frequency to the second variation component $\theta_{2var}$ is as the following formula (4).

$$p_1 = \frac{1}{2}A\omega_h I_s^2(L_d - L_q)\sin 2\theta_{2ave} \tag{4}$$

The amplitude $p_1$ is calculated by the above-described reluctance torque being multiplied by the amplitude A and the angular frequency $\omega_h$.

In the formula (3), an amplitude $p_2$ of a sine component having an identical angular frequency to the second variation component $\theta_{2var}$ is as the following formula (5).

$$p_2 = A\omega I_s^2(L_d - L_q)\sin 2\theta_{2ave} + A\omega\phi I_s \sin\theta_{2ave} \tag{5}$$

The amplitude $p_2$ is calculated by both the magnetic torque and the reluctance torque of the formula (1) being multiplied by the amplitude A and an angular frequency ω, and further, the reluctance torque being multiplied by 2. Therefore, extracting the amplitudes $p_1$ and $p_2$ can estimate the torque.

The information extractor 132 extracts a component generated by a change of the first phase angle $\theta_1$ from the electric power information calculated by the electric power calculator 131. For example, the information extractor 132 extracts a component corresponding to the first variation component $\theta_{1var}$ superimposed to the first basic phase angle $\theta_{1ave}$ from the electric power information. For example, the information extractor 132 includes a first extractor 134, a second extractor 135, and a third extractor 136.

The first extractor 134 extracts a component having an identical frequency to the first variation component $\theta_{1var}$ from the electric power information. For example, the first extractor 134 is a band-pass filter whose pass band is an identical frequency band range to the first variation component $\theta_{1var}$. Extracting the component having the identical frequency to the first variation component $\theta_{1var}$ from the electric power information includes extracting the component having the identical frequency to the second variation component $\theta_{2var}$ from the electric power information. For example, the first extractor 134 obtains extraction results $P_{e\_BPF}$ and $p_{r\_BPF}$ expressed by the following formulas (6) and (7) from the electric power information expressed by the formula (2) and the formula (3).

$$P_{e\_BPF} = -\frac{1}{2}I_s^2 A\omega_h(L_d - L_q)\cos(\omega_h t)\sin 2\theta_{2ave} + \tag{6}$$

$$I_s \omega\phi \cos\theta_{2ave} A \sin(\omega_h t) + \omega I_s^2 A(L_d - L_q)\cos 2\theta_{2ave}\sin(\omega_h t)$$

$$P_{r\_BPF} = \frac{3}{2} \begin{pmatrix} -A\omega_h I_s^2(L_d\sin^2\theta_{2ave} + L_q\cos^2\theta_{2ave})\cos(\omega_h t) + \\ A\omega I_s^2(L_d - L_q)\sin 2\theta_{2ave}\sin(\omega_h t) + \\ A\omega\phi I_s\sin\theta_{2ave}\sin(\omega_h t) \end{pmatrix} \quad (7)$$

The second extractor 135 transforms a component that correlates with the power (torque) in the extraction result (hereinafter referred to as a "first extraction result") by the first extractor 134 to a direct current quantity. The direct current quantity here means a quantity that does not vary corresponding to the variation of the first variation component $\theta_{1var}$. For example, the second extractor 135 transforms the cosine component having the identical frequency to the first variation component $\theta_{1var}$ in the first extraction result regarding the effective power to the direct current quantity. Furthermore, the second extractor 135 transforms, for example, the sine component having the identical frequency to the first variation component $\theta_{1var}$ in the first extraction result regarding the reactive power to the direct current quantity. Transforming the cosine component or the sine component having the identical frequency to the first variation component $\theta_{1var}$ to the direct current quantity includes transforming the cosine component or the sine component having the identical frequency to the second variation component $\theta_{2var}$ to the direct current quantity.

For example, the second extractor 135 multiplies cos ($\omega_h t$) to the above-described extraction result $P_{e\_BPF}$ and multiplies sin ($\omega_h t$) to the above-described extraction result $P_{r\_BPF}$ to obtain extraction results $P_{e\_h}$ and $P_{r\_h}$ expressed by the following formulas (8) and (9).

$$P_{e\_h} = -\frac{1}{4}A\omega_h I_s^2(L_d - L_q)\sin 2\theta_{2ave} + \quad (8)$$
$$-\frac{1}{4}A\omega_h I_s^2(L_d - L_q)\sin 2\theta_{2ave}\cos(2\omega_h t) +$$
$$\frac{1}{2}AI_s\omega\phi\cos\theta_{2ave}\sin(2\omega_h t) + \frac{1}{2}A\omega I_s^2(L_d - L_q)\cos 2\theta_{2ave}\sin(2\omega_h t)$$

$$P_{r\_h} = \frac{3}{2}\begin{pmatrix} -\frac{1}{2}A\omega_h I_s^2(L_d\sin^2\theta_{2ave} + L_q\cos^2\theta_{2ave})\sin(2\omega_h t) + \\ \frac{1}{2}A\omega I_s^2(L_d - L_q)\sin 2\theta_{2ave} - \\ \frac{1}{2}A\omega I_s^2(L_d - L_q)\sin 2\theta_{2ave}\cos(2\omega_h t) + \\ \frac{1}{2}A\omega\phi I_s\sin\theta_{2ave} - \frac{1}{2}A\omega\phi I_s\sin\theta_{2ave}\cos(2\omega_h t) \end{pmatrix} \quad (9)$$

The third extractor 136 extracts a component transformed to the direct current quantity (hereinafter referred to as a "DC component") by the second extractor 135. For example, the second extractor 135 is a low-pass filter that causes the direct current quantity to pass through. For example, the third extractor 136 obtains the above-described amplitudes $p_1$ and $p_2$ from the above-described extraction results $P_{e\_h}$ and $P_{r\_h}$.

The power calculator 133 calculates the power (a power generated by the electric motor 4) based on the component extracted by the information extractor 132. For example, the power calculator 133 calculates the power based on the DC component extracted by the third extractor 136. According to the examples indicated by the formulas (1) to (9), the power calculator 133 calculates a power estimate value $T_e$ expressed by the following formula (10) using the above-described amplitudes $p_1$ and $p_2$.

$$T_e = \phi I_s\sin\theta_{2ave} + \frac{1}{2}(L_d - L_q)I_s^2\sin 2\theta_{2ave} \quad (10)$$
$$= \frac{p_2}{A\omega} - \frac{p_1}{A\omega_h}$$

As apparent from the formula (1) and the formula (10), the power estimate value $T_e$ corresponds to the torque of the case where the second phase angle $\theta_2$ is the second basic phase angle $\theta_{2ave}$. Thus, with the power estimator 130, the power of the electric motor 4 can be estimated without using the constant (for example, a resistance value and an inductance) of the electric motor 4. The second basic phase angle $\theta_{2ave}$ is an average value of the second phase angle $\theta_2$ that varies by superimposing the second variation component $\theta_{2var}$, and a value between the maximum value $\theta_{2max}$ and the minimum value $\theta_{2min}$ of the second phase angle $\theta_2$.

The power compensator 140 obtains a deviation between the power target value $T_{ref}$ and the power estimate value $T_e$, which is obtained by the power estimator 130, and changes the first target electric current $i_{1ref}$ such that this deviation is decreased. For example, the power compensator 140 calculates a correction value $i_{comp}$ such that the above-described deviation is decreased and incorporates (for example, adds) this correction value $i_{comp}$ to the first target electric current $i_{1ref}$. This controls the power converter circuit 5 such that the power estimate value $T_e$ is approximated to the power target value $T_{ref}$.

Figure 5:
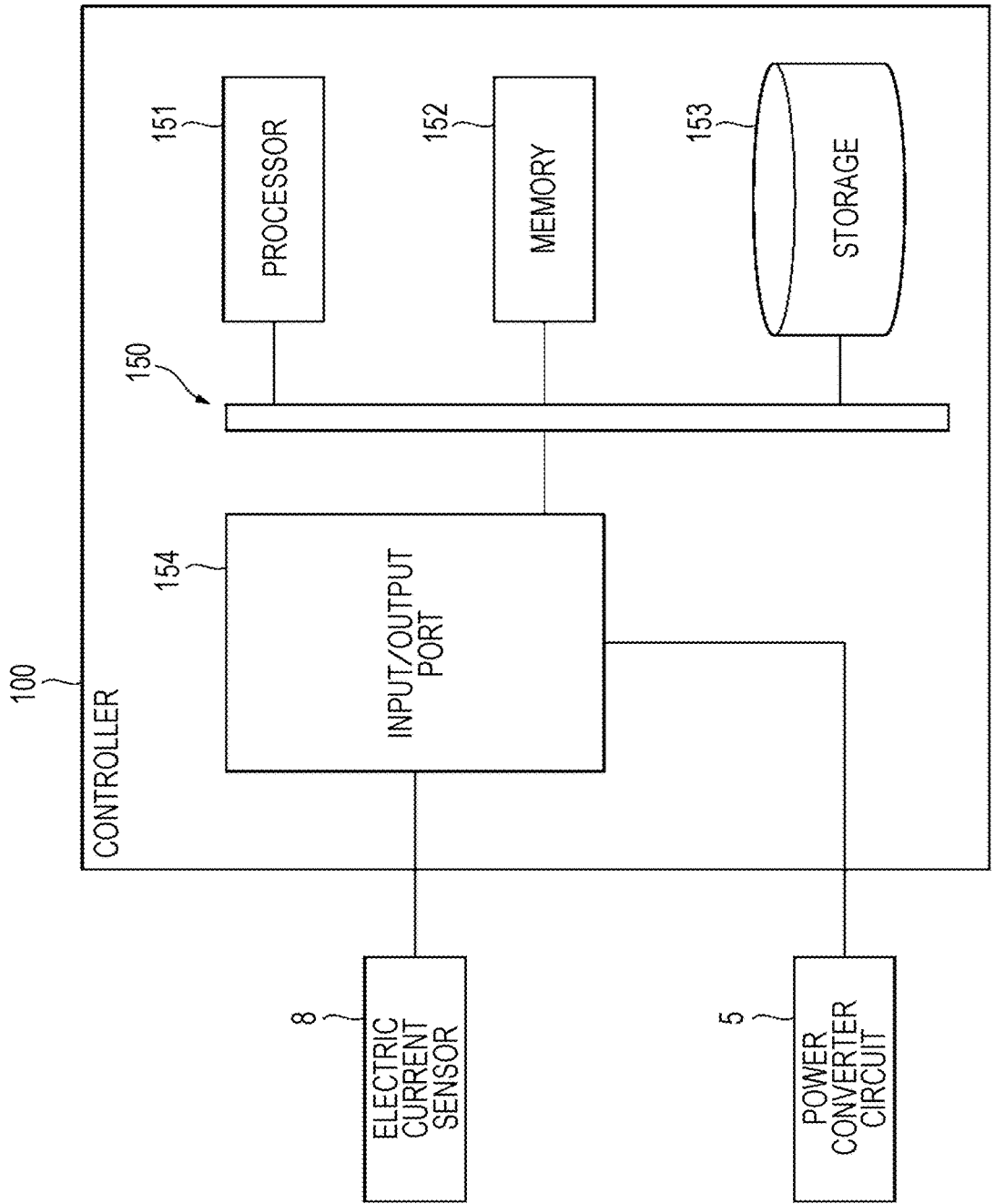
FIG. 5 is a hardware configuration diagram of the controller.

The hardware of the controller 100 includes, for example, one or a plurality of control computers. The controller 100 includes, for example, a circuit 150 illustrated in FIG. 5 as a configuration of the hardware. The circuit 150 includes a processor 151, a memory 152, a storage 153, and an input/output port 154. The input/output port 154 performs, for example, in addition to inputting and outputting external signals including a signal from the electric current sensor 8, inputting and outputting a signal to the power converter circuit 5. The processor 151 collaborates with at least one of the memory 152 and the storage 153 to execute the program and execute inputting and outputting a signal via the input/output port 154. This constitutes the above-described function module for the processor 151.

2. Control Procedure of Electric Motor

Subsequently, a control procedure of the electric motor 4 by the power conversion apparatus 3 will be described as one example of the control methods of the electric motor. This procedure includes the power estimating method for the electric motor 4. This power estimating method includes adding the above-described first change to the above-described first phase angle, and extracting a component generated by the first change from the information regarding the electric power supplied to the electric motor 4 and estimating the power generated by the electric motor 4 based on this component.

Figure 6:
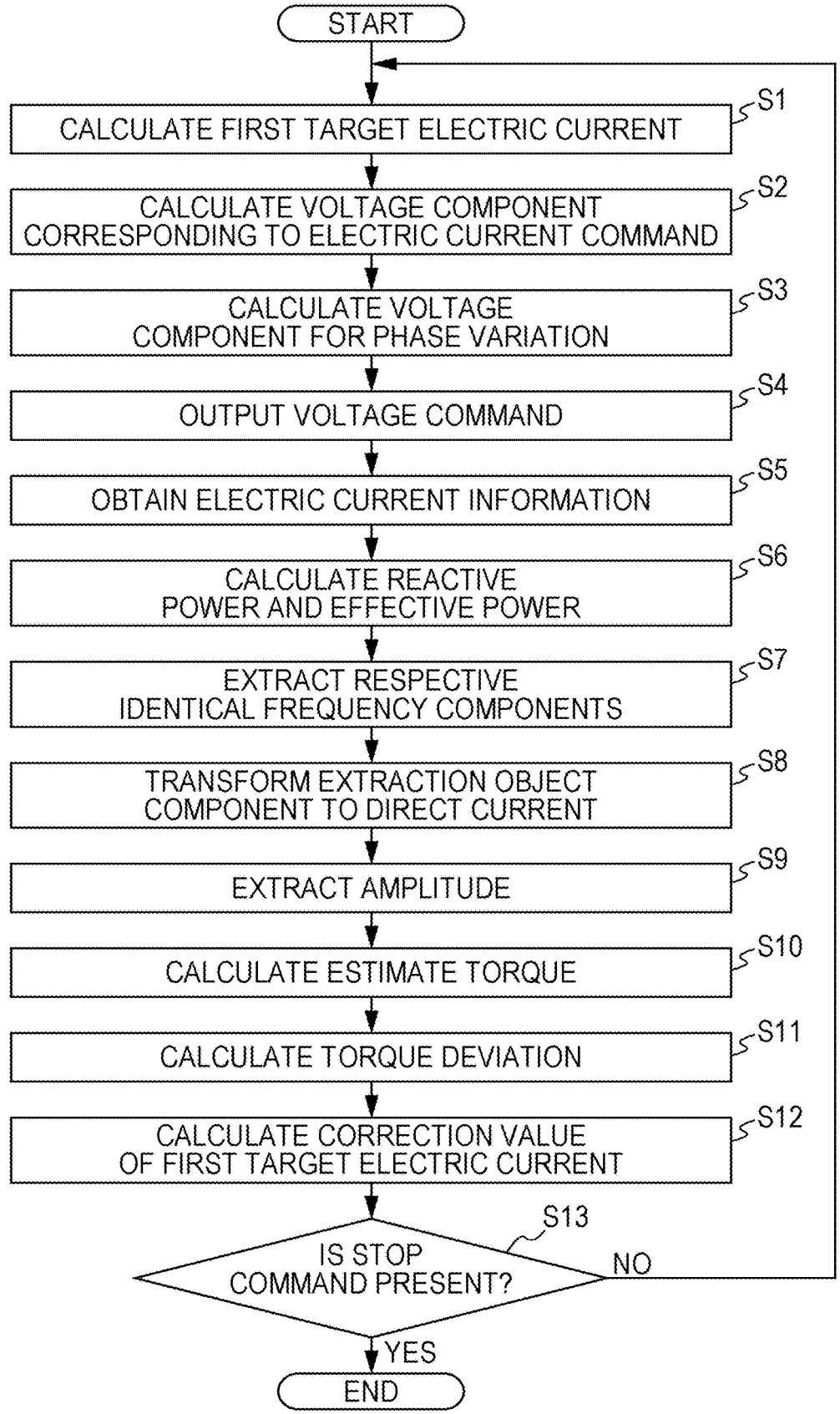
FIG. 6 is a flowchart illustrating a power estimating method.

As illustrated in FIG. 6, the controller 100, first executes Step S1. At Step S1, the power controller 110 calculates the first target electric current $i_{1ref}$ corresponding to the power target value $T_{ref}$. The power compensator 140 adds the correction value $i_{comp}$ of the first target electric current $i_{1ref}$ to the first target electric current $i_{1ref}$. Hereinafter, the first target electric current $i_{1ref}$ added by the correction value $i_{comp}$ is referred to as "the first target electric current $i_{1ref}$ after correction." The power compensator 140 adds a preliminary set initial value (for example, zero) as the correction value $i_{comp}$ to the first target electric current $i_{1ref}$ immediately after this procedure is started.

Next, the controller 100 executes Step S2. At Step S2, the first voltage calculator 121 calculates the first voltage command value $v_{1ref}$ (voltage component) for generating the electric current corresponding to the first target electric current $i_{1ref}$ after correction (electric current command).

Next, the controller 100 executes Step S3. At Step S3, the second voltage calculator 122 obtains the second target electric current $i_{2ref}$ to superimpose the first variation component $\theta_{1var}$ to the first basic phase angle $\theta_{1ave}$. Furthermore, the second voltage calculator 122 calculates the second voltage command value $v_{2ref}$ (voltage component for phase variation) to generate the electric current corresponding to this second target electric current $i_{2ref}$.

Next, the controller 100 executes Step S4. At Step S4, the adder 123 calculates the voltage command value $v_{ref}$ by combining the first voltage command value $v_{1ref}$ and the second voltage command value $v_{2ref}$. Furthermore, the coordinate transformer 124, the number of phase transformer 125, and the gate driver 126 control the power converter circuit 5 so as to apply the voltage corresponding to the voltage command value $v_{ref}$ to the coils of the electric motor 4. This causes the first phase angle $\theta_1$ to vary with respect to the first basic phase angle $\theta_{1ave}$.

Next, the controller 100 executes Step S5. At Step S5, the number of phase transformer 127 and the coordinate transformer 128 obtain the detected electric current $i_{det}$ (electric current information) detected by the electric current sensor 8.

Next, the controller 100 executes Step S6. At Step S6, the electric power calculator 131 calculates the information regarding the electric power supplied to the electric motor 4. For example, the electric power calculator 131 calculates the above-described effective power information and the above-described reactive power information based on the voltage information and the electric current information.

Next, the controller 100 executes Step S7 to S10. At Step S7, the first extractor 134 extracts the component having the identical frequency to the first variation component $\theta_{1var}$ from the electric power information. At Step S8, the second extractor 135 transforms the component that correlates with the power in the extraction result by the first extractor 134 (extraction object component) to the direct current quantity. At Step S9, the third extractor 136 extracts the component transformed to the direct current quantity by the second extractor 135 (for example, the amplitudes $p_1$ and $p_2$). At Step S10, the power calculator 133 calculates the above-described power estimate value $T_e$ (estimate torque) based on the component extracted by the third extractor 136.

Next, the controller 100 executes Step S11 and S12. At Step S11, the power compensator 140 calculates the deviation (torque deviation) between the power target value $T_{ref}$ and the power estimate value $T_e$. At Step S12, the power compensator 140 calculates the correction value $i_{comp}$ of the first target electric current $i_{1ref}$ such that the deviation calculated at Step S11 is decreased.

Subsequently, the controller 100 repeats Step S1 to S12 unless the controller 100 receives a stop command, and the controller 100 terminates the process when receiving the stop command (Step S13). Thus, the control procedure of the electric motor 4 is completed.

3. Operation and Advantageous Effect of this Embodiment

As described above, the power conversion apparatus 3 includes the power converter circuit 5, which outputs the AC power to the electric motor 4, and the controller 100. The controller 100 is configured to execute controlling the power converter circuit 5 such that the first change accompanying the change of the power generated by the electric motor 4 is added to the first phase angle, which is the phase angle of the magnetic flux direction of the electric motor 4 corresponding to the AC power supplied. Furthermore, the controller 100 is configured to execute extracting the component generated by the first change from the information regarding the electric power supplied to the electric motor 4 and estimating the power generated by the electric motor 4 based on this component.

When the controller 100 adds the first change to the first phase angle, the component that correlates with the power (power generated by the electric motor 4) appears in the information regarding the voltage and the electric current. In view of this, extracting this component ensures estimating the power.

With this method, the power can be estimated without assigning a specific numerical value to the constant (such as the resistance value and the inductance) of the electric motor 4. Therefore, an estimation error caused by a divergence between the above-described constant and the above-described specific numerical value is not generated. Accordingly, the power can be estimated with higher accuracy.

Controlling the power converter circuit 5 such that the first change is added to the first phase angle may include controlling the power converter circuit 5 such that the second change accompanying the change of the power is added to the second phase angle, which is the phase angle of the electric current vector $i_{vec}$ of the electric motor 4.

The information regarding the electric power supplied to the electric motor 4 may include the information regarding the reactive power $P_r$ and the effective power $P_e$ supplied to the electric motor 4. In this case, combining the component extracted from the reactive power $P_r$ and the component extracted from the effective power $P_e$ ensures estimating the power with higher accuracy.

The first change may include the periodic variation. In this case, using the frequency characteristic of the filter ensures easily extracting the component that correlates with the power. In view of this, the power can be easily estimated.

The periodic variation may include the variation at a higher frequency than the frequency of the AC power. In this case, the movement of the rotor 4a of the electric motor 4 is hard to follow the first change. In view of this, an influence that the first change has on the movement of the electric motor 4 can be restrained.

The controller 100 may be configured to further execute compensating the response delay of the electric current relative to the target electric current to add the first change to the first phase angle. In this case, varying the first phase angle as intended ensures more certainly yielding the component that correlates with the power. In view of this, the power can be estimated with higher accuracy.

The controller 100 may be configured to estimate the power corresponding to the first phase angle between the maximum value and the minimum value of the first phase angle in transition. In this case, the power can be estimated with higher accuracy.

While the embodiment has been described above, the technique of this disclosure is not necessarily limited to the above-described embodiment and various modifications may be made without departing from the spirit and scope of this disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A power conversion apparatus, comprising:
a power converter circuit that outputs an AC power to an electric motor;
first circuitry configured to control the power converter circuit; and
wherein the first circuitry includes second circuitry that is configured to add a periodical first change to a first phase angle and extract, from first information indicating an electric power supplied to the electric motor, a component generated by the periodical first change and transmit the component to third circuitry, and the third circuitry is further configured to estimate the power generated by the electric motor using the generated component as a term in a power estimation formula, wherein the component has an identical frequency to a variation component in the periodical first change,
the periodical first change causes a change of the power generated by the electric motor, and the first phase angle is a phase angle of a magnetic flux direction of the electric motor corresponding to the AC power.

2. The power conversion apparatus according to claim 1, wherein the second circuitry is further configured to add a second change causing a change of the power to a second phase angle, which is a phase angle of an electric current vector of the electric motor.

3. The power conversion apparatus according to claim 2, wherein the first information includes second information indicating a reactive power and an effective power supplied to the electric motor.

4. The power conversion apparatus according to claim 1, wherein the first information includes second information indicating a reactive power and an effective power supplied to the electric motor.

5. The power conversion apparatus according to claim 1, wherein the periodical first change includes a periodic variation.

6. The power conversion apparatus according to claim 5, wherein the periodic variation includes a variation at a higher frequency than a frequency of the AC power.

7. The power conversion apparatus according to claim 6, wherein the second circuitry is further configured to control compensation of a response delay of an electric current relative to a target electric current in order to add the periodical first change to the first phase angle.

8. The power conversion apparatus according to claim 1, wherein the third circuitry is further configured to estimate a second power corresponding to the first phase angle between a maximum value and a minimum value of the first phase angle in transition.

9. The power conversion apparatus according to claim 1, wherein the first circuitry is further configured to control the power converter circuit to approximate the estimated power to a power target value.

10. The power conversion apparatus according to claim 1, wherein the second circuitry is connected between the power converter circuit and the third circuitry.

11. The power conversion apparatus according to claim 1, wherein the component includes a cosine component and a sine component each having an identical angular frequency to the variation component.

12. A power estimating method for an electric motor, comprising:
adding a periodical first change to a supplied AC power using a first circuitry;
extracting, using the first circuitry and from first information indicating an electric power supplied to the electric motor, a component generated by the periodical first change and transmitting the component to second circuitry, wherein the component has an identical frequency to a variation component in the periodical first change; and
estimating, using second circuitry, the power generated by the electric motor using the generated component as a term in a power estimation formula,
wherein the periodical first change causes a change of the power generated by the electric motor, and the basic phase angle is a phase angle of a magnetic flux direction of the electric motor corresponding to the AC power.

13. The power estimating method for the electric motor according to claim 12, wherein the adding the periodical first change to the first phase angle further includes adding a second change causing a change of the power to a second phase angle, which is a phase angle of an electric current vector of the electric motor.

14. The power estimating method for the electric motor according to claim 12, wherein the first information indicating the electric power supplied to the electric motor includes second information indicating a reactive power and an effective power supplied to the electric motor.

15. The power estimating method for the electric motor according to claim 12, wherein the periodical first change includes a periodic variation.

16. The power estimating method for the electric motor according to claim 15, wherein the periodic variation includes a variation at a higher frequency than a frequency of the AC power.

17. A control method for an electric motor, comprising:
controlling, using first circuitry, a power converter circuit to add a periodical first change causing a change of a power generated by an electric motor to a first phase angle, which is a phase angle of a magnetic flux direction of the electric motor corresponding to a supplied AC power;
extracting, using the first circuitry and from first information indicating an electric power supplied to the electric motor, a component generated by the periodical first change and transmitting the component to second circuitry, wherein the component has an identical frequency to a variation component in the periodical first change; and
estimating, using second circuitry, the power generated by the electric motor using the generated component as a term in a power estimation formula.

18. The control method for the electric motor according to claim 17, further comprising
controlling the power converter circuit to approximate the estimated power to a power target value.

19. The control method for the electric motor according to claim 17, wherein the controlling of the power converter circuit to add the periodical first change to the first phase angle further includes controlling the power converter circuit to add a second change causing a change of the power to a second phase angle, which is a phase angle of an electric current vector of the electric motor.

20. The control method for the electric motor according to claim 17, wherein the first information indicating the electric power supplied to the electric motor includes second information regarding a reactive power and an effective power supplied to the electric motor.

21. The control method for the electric motor according to claim 17, wherein the periodical first change includes a periodic variation.

22. The control method for the electric motor according to claim 21, wherein the periodic variation includes a variation at a higher frequency than a frequency of the AC power.

* * * * *